Sept. 24, 1957 C. W. MUSSER 2,807,195

CARTRIDGE CASE HOLDER AND EXTRACTOR AND BREECH MECHANISM FOR HEAVY CALIBER RECOILLESS GUN

Filed July 1, 1948 7 Sheets-Sheet 1

INVENTOR.
C. WALTON MUSSER.
BY
G. J. Kessenich & J. H. Church
ATTORNEYS.

INVENTOR.
C. WALTON MUSSER.
BY
G. J. Kessenich & J. H. Church
ATTORNEYS

Sept. 24, 1957 C. W. MUSSER 2,807,195

CARTRIDGE CASE HOLDER AND EXTRACTOR AND BREECH MECHANISM FOR HEAVY CALIBER RECOILLESS GUN

Filed July 1, 1948 7 Sheets-Sheet 3

INVENTOR.
C. WALTON MUSSER.
BY
G. J. Kessenich & J. H. Church
ATTORNEYS

INVENTOR.
C. WALTON MUSSER.
BY
G. J. Kessenich & J. H. Church
ATTORNEYS.

Sept. 24, 1957 C. W. MUSSER 2,807,195

CARTRIDGE CASE HOLDER AND EXTRACTOR AND BREECH MECHANISM FOR HEAVY CALIBER RECOILLESS GUN

Filed July 1, 1948 7 Sheets-Sheet 5

INVENTOR.
C. WALTON MUSSER.
BY
G. J. Kessenich & J. H. Church
ATTORNEYS.

INVENTOR.
C. WALTON MUSSER.
BY
G. J. Kessenich & J. H. Church
ATTORNEYS.

INVENTOR.
C. WALTON MUSSER.
BY
G. J. Kessenich & J. H. Church
ATTORNEYS.

United States Patent Office 2,807,195
Patented Sept. 24, 1957

2,807,195

CARTRIDGE CASE HOLDER AND EXTRACTOR AND BREECH MECHANISM FOR HEAVY CALIBER RECOILLESS GUN

Clarence Walton Musser, Philadelphia, Pa., assignor to the United States of America as represented by the Secretary of War Application July 1, 1948, Serial No. 36,508
7 Claims. (Cl. 89—21)
(Granted under Title 35, U. S. Code (1952), sec. 266)

The invention described herein may be manufactured and used by or for the Government, for governmental purposes, without the payment of any royalty thereon.

The present application is a continuation-in-part of application Serial No. 677,947, filed on June 20, 1946, in the name of Clarence W. Musser for "Heavy Caliber Recoilless Firearm," which application is now abandoned.

This invention relates to breech mechanisms and to cartridge case retention and extraction mechanisms for guns of the recoilless type, and it has special reference to mechanisms usable in non-recoil guns wherein the forces of rearward reaction that result from projectile discharge are neutralized by forwardly acting counter-forces simultaneously set up by a rearward escape of propellent powder gas through openings or orifices in the gun's breech.

Broadly stated, the object of this invention is to provide improved breech mechanisms and cartridge case retention and extraction mechanisms for heavy caliber recoilless guns which incorporate principles of construction earlier disclosed and claimed by the following co-pending applications: (*a*) Kroeger-Musser, Serial No. 536,590, filed May 20, 1944, for "Recoilless Firearms, Ammunition Therefor, and Ballistic Design Thereof," which application is now abandoned; (*b*) Kroeger-Musser, Serial No. 577,830, filed February 14, 1945, for "Medium Caliber Recoilless Firearm and Ammunition Therefor," which application has matured into U. S. Patent No. 2,472,111; (*c*) Musser, Serial No. 605,614, filed July 17, 1945, for "Aligning Device for Pre-Engraved Projectiles," which application has matured into U. S. Patent No. 2,456,011; (*d*) Musser, Serial No. 628,647, filed November 14, 1945, for "Recoilless Firearm With Replaceable Chamber Reliner," which application has matured into U. S. Patent No. 2,444,949.

A more specific object is to make available improved breech constructions, provide improved means for retaining a cartridge case within the gun chamber when the gun is in elevated position, and further to provide improved extractor means for withdrawing the cartridge case after an ammunition round is fired.

Another object is to simplify the structure and reduce the number of parts needed by the gun's breech mechanism and to arrange those parts in a uniquely compact manner.

A further object is to provide "foolproof" cartridge case extraction and retention and breech mechanisms which assure simplicity of assembly and which make incorrect assembly impossible.

A still further object is completely to enclose the breech mechanism parts to assure "trouble-free" operation under all service conditions including the most adverse.

An additional object is to incorporate "double safety" features into the breech mechanism design.

Other objects and advantages will become apparent as the disclosure and description hereof proceed.

In accomplishing the foregoing, incorporation has been made in the new heavy caliber gun of the closed annular breech orifice, the "perforated cartridge case," the "torque compensation," the "tapered chamber," and the "replaceable relined" principles which the co-pending applications earlier named broadly cover. In supplement thereto, provision is made for improved breech mechanism constructions which are simpler, more compact and rugged, and which are coordinated in a unique way that permits quicker, safer and more convenient loading. In further supplement to the inventions covered by the said co-pending applications, provision is made for an improved positive-action case extractor and a novel detent means for assuring retention of the cartridge case within the gun chamber at all positions of gun elevation.

The present invention itself, together with illustrative embodiments thereof, will best be understood from the following description when taken in conjunction with the accompanying drawings wherein.

Figures 1, 1A, 2:
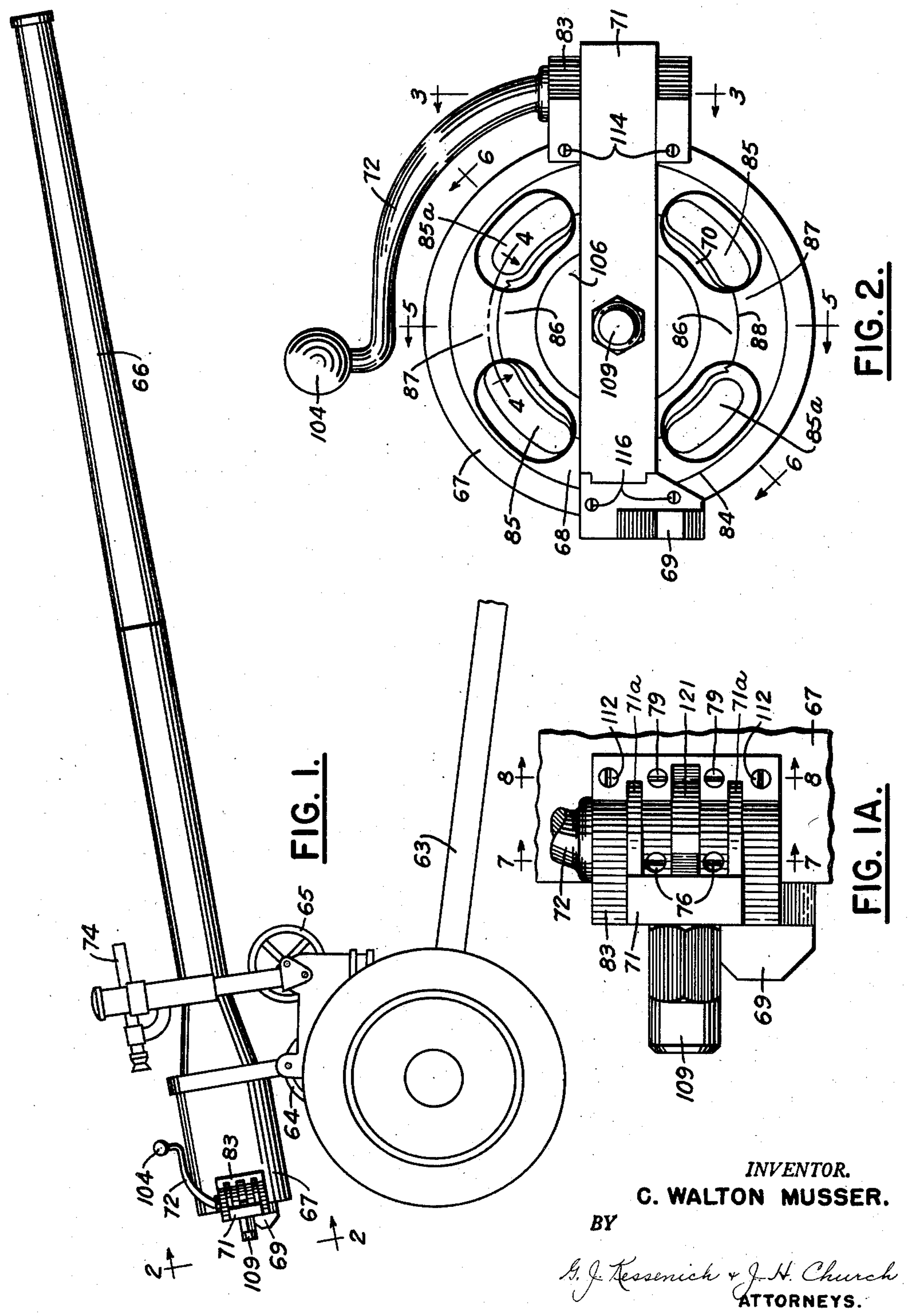
Fig. 1 is a view in side elevation of a recoilless gun of 105 mm. caliber incorporating the inventive features hereof, the gun being shown as mounted on a two-wheel carriage of the trailer type conventionally pulled by small automobiles such as the well-known "jeep"
Fig. 1A is an enlarged view of the hinge block and associated mechanisms shown in Fig. 1.
Fig. 2 is a view taken from line 2—2 of Fig. 1 to show the weapon in rear elevation with the breech block thereof fully closed.
Figures 3, 4, 5, 6, 7:
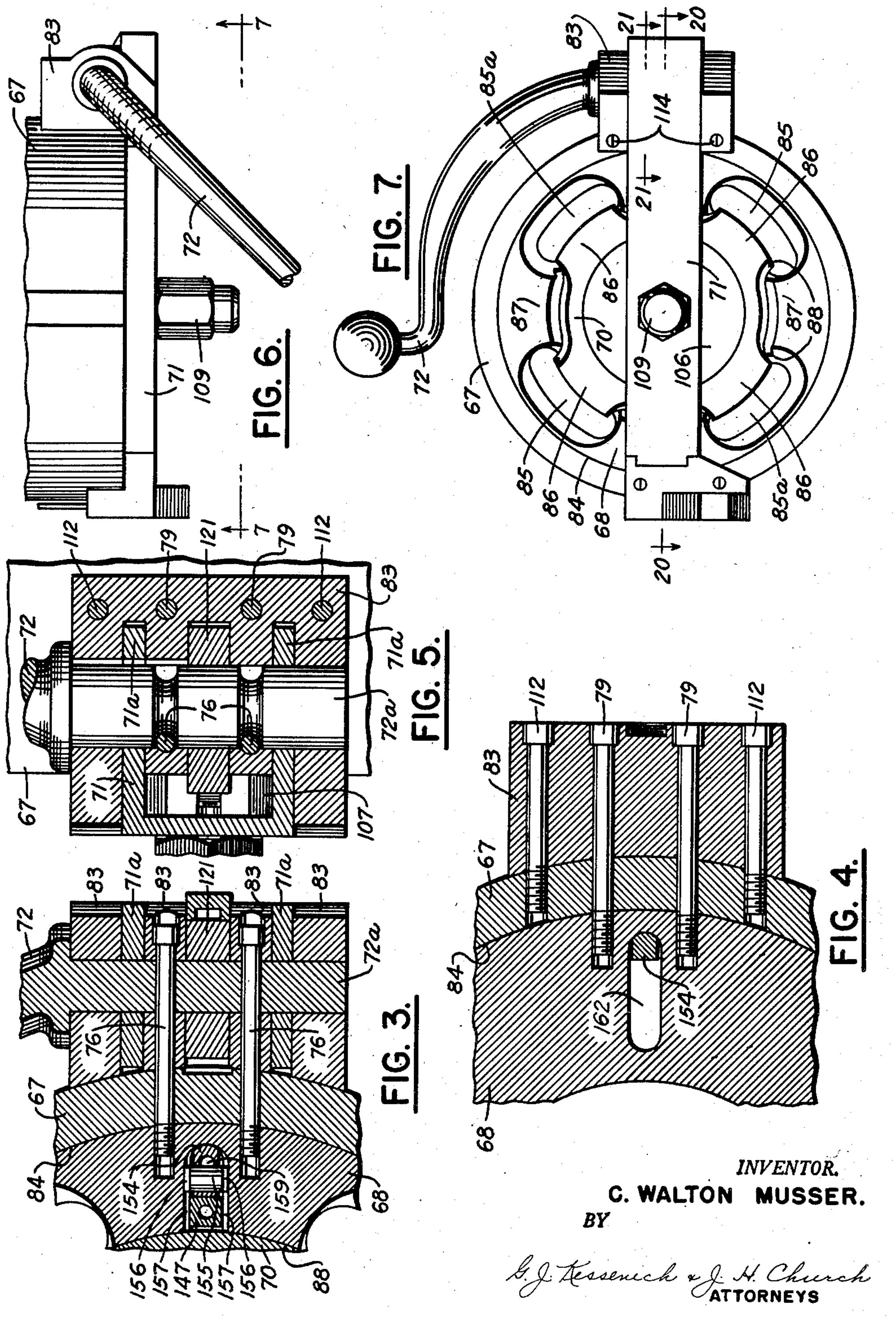
Figure 8:
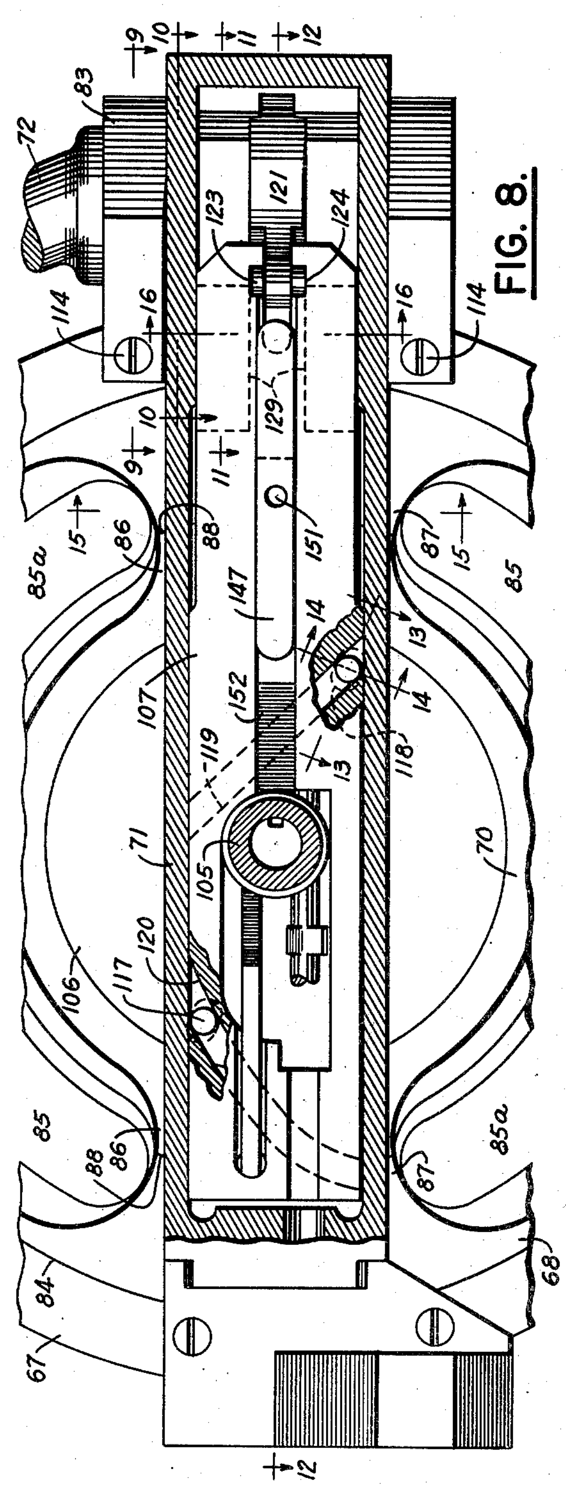
Figure 11:
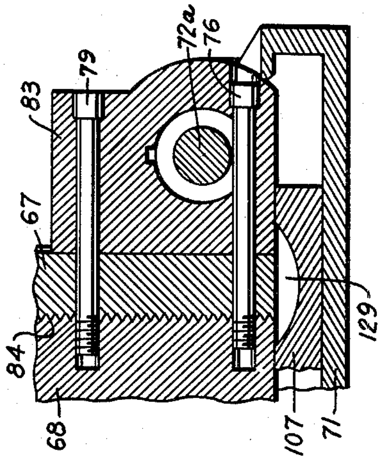
Figure 10:
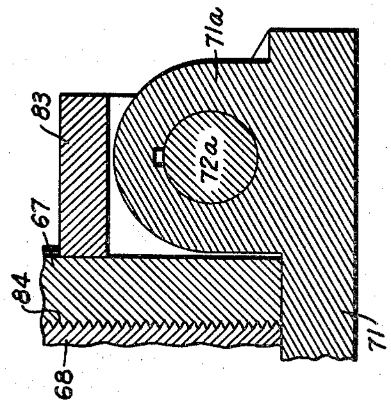
Figure 9:
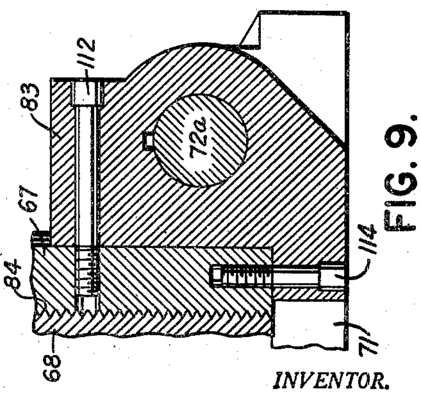
Figure 12:
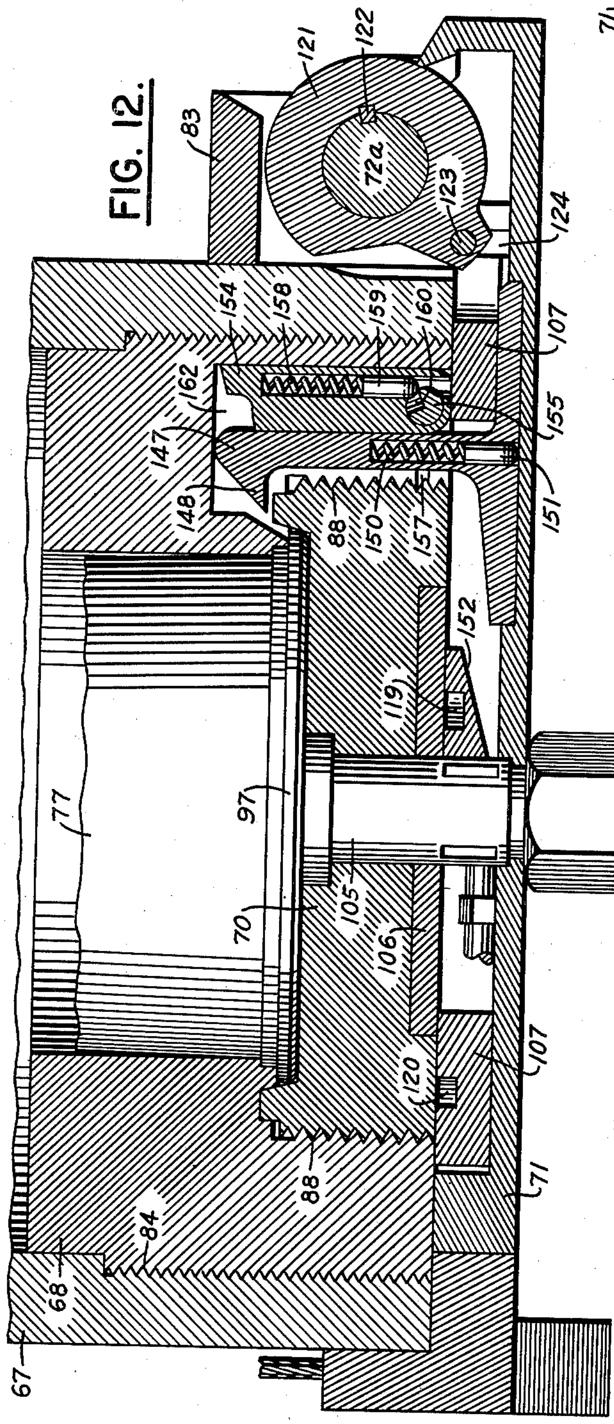
Figure 16:
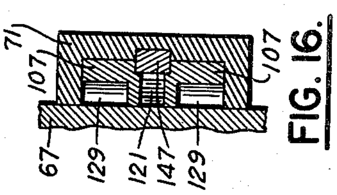
Figure 15:
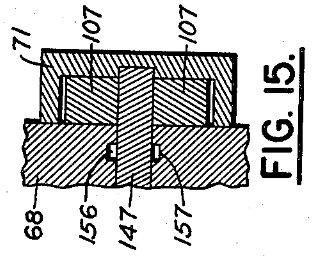
Figure 14:
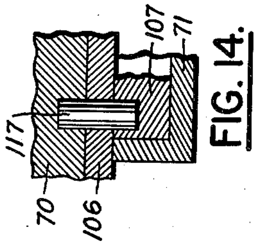
Figure 13:
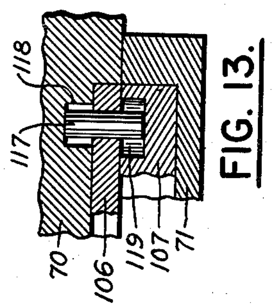
Figures 17, 18, 19:
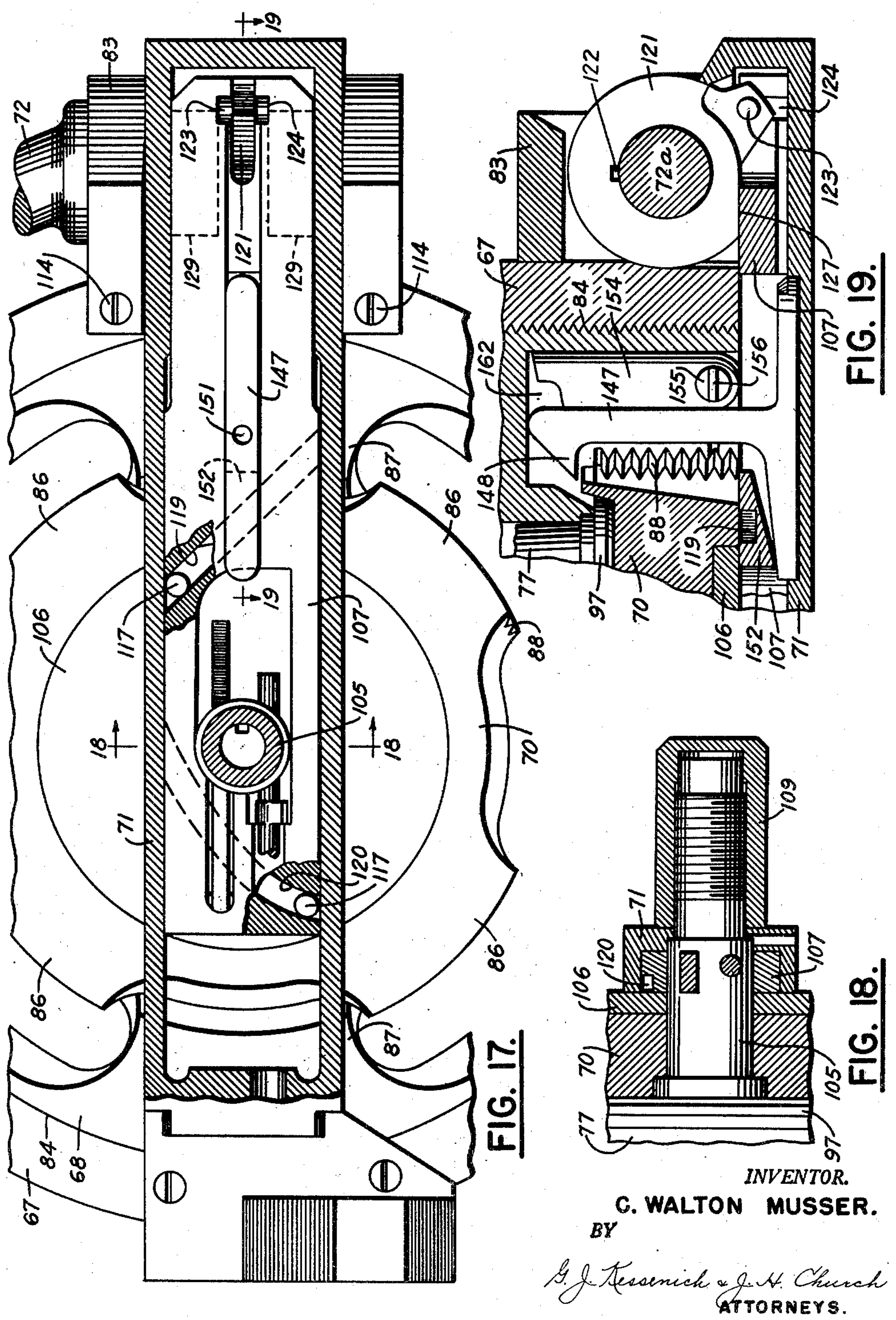
Figures 20, 21:
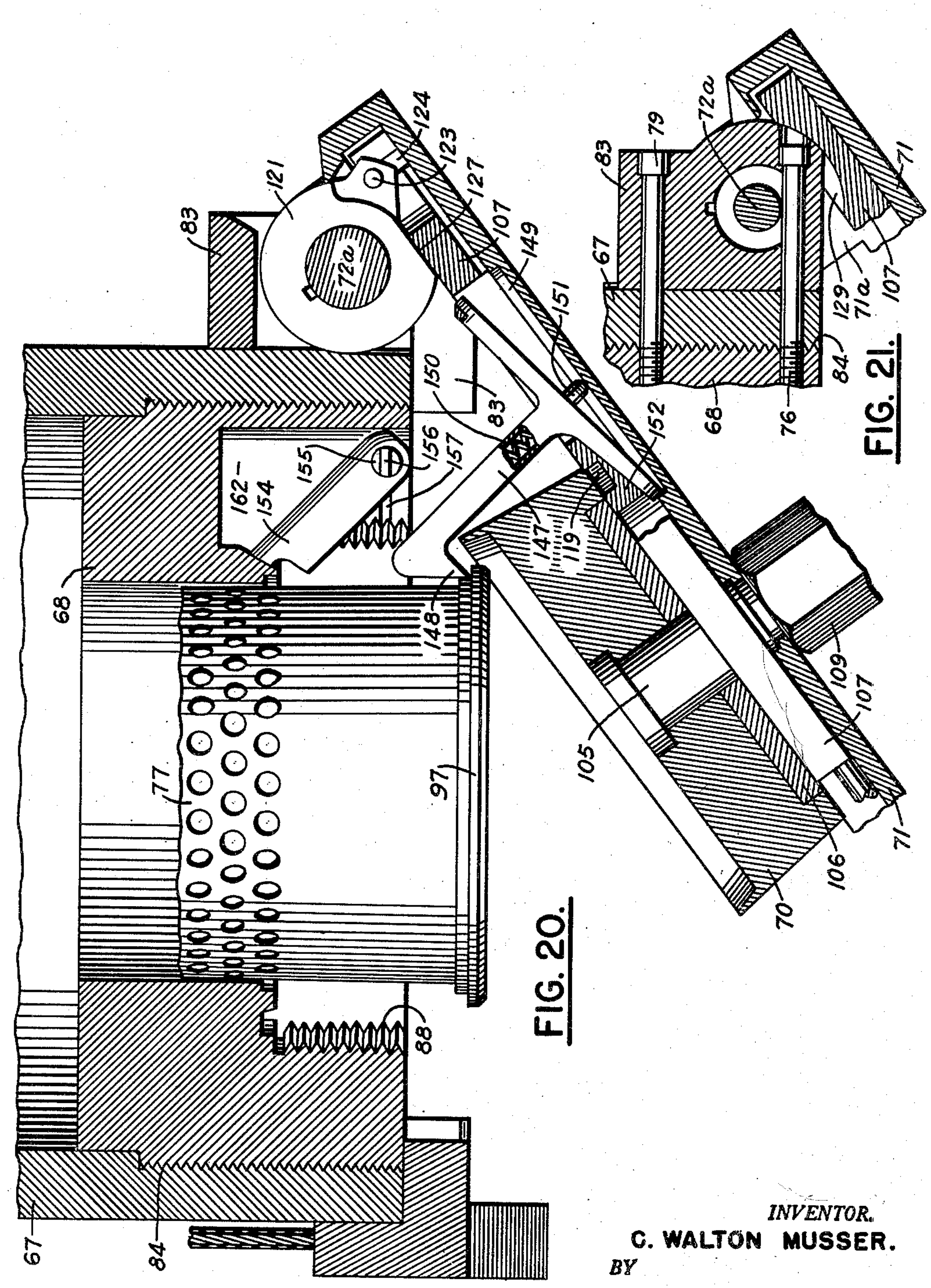
Figures 22, 23, 24, 24A, 25:
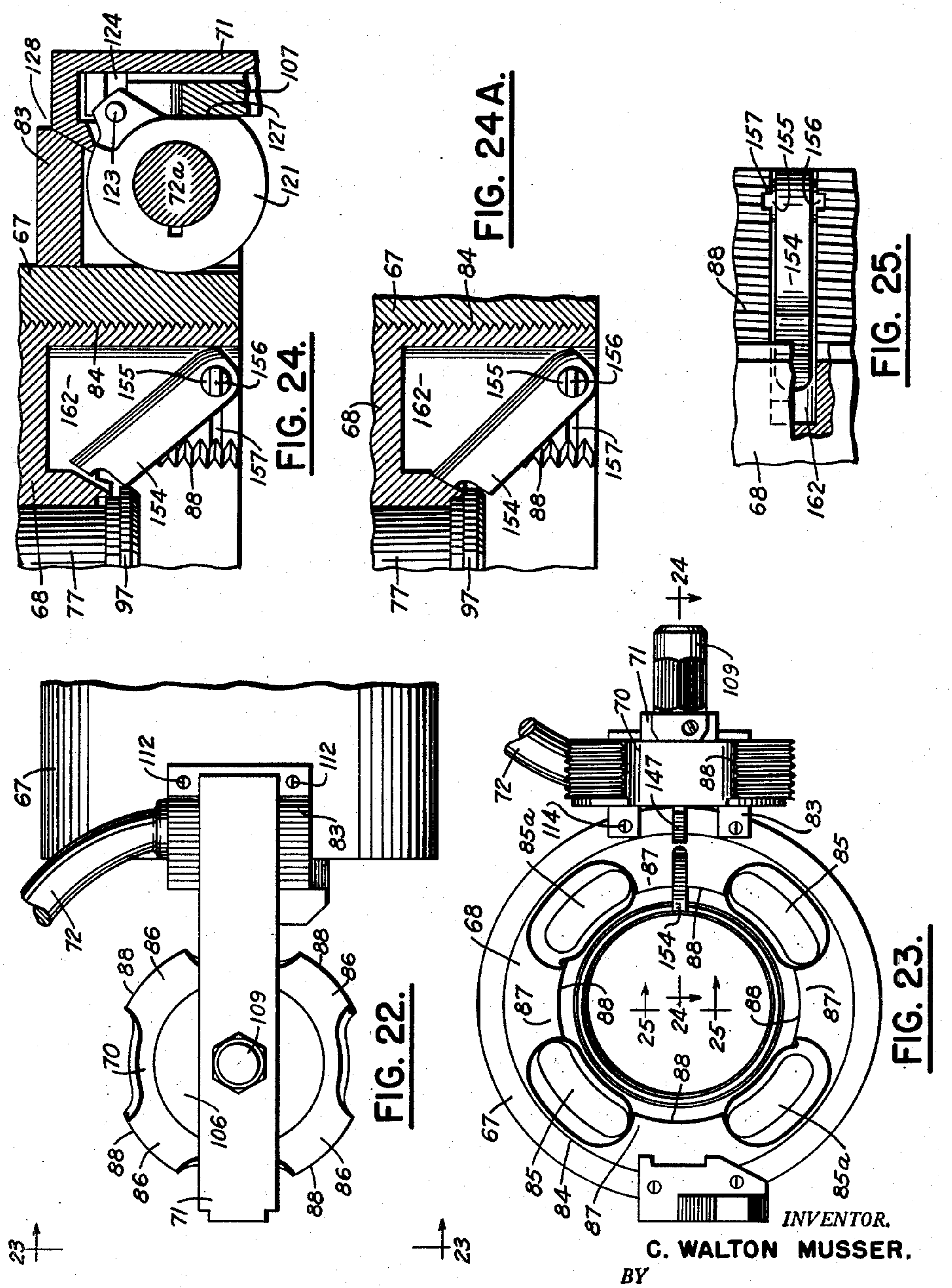

Figs. 3 and 4 are enlarged sections on lines 3—3 and 4—4 of Fig. 1A showing how the hinge block is fastened to the chamber's right side;

Fig. 5 is an enlarged section on line 5—5 of Fig. 2 showing how the operating handle is related to certain cooperating parts;

Fig. 6 is a plan view showing of the breech end of the gun with the operating handle rotated to an intermediate position wherein the breech block is unlocked from the chamber;

Fig. 7 is a rear elevation of the gun taken from line 7—7 of Fig. 6;

Fig. 8 is an enlarged rear view of the breech actuating mechanism of Fig. 2 with portions cut away to show the internal construction and with the parts in the "locked" handle position of Figs. 1–2;

Fig. 9 is a section on line 9—9 of Fig. 8 showing details of the hinge block and the handle stem;

Fig. 10 is a section on line 10—10 of Fig. 8 through the handle stem and the right end of the hinge;

Fig. 11 is a section on line 11—11 of Fig. 8 showing the right-end undercut on the cam plate and how same permits breech block withdrawal only when the cam plate is properly positioned;

Fig. 12 is a section on line 12—12 of Fig. 8 showing important internal constructions of the breech actuating mechanism;

Fig. 13 is a section on line 13—13 of Fig. 8 showing one of the rollers by which the breech block is rotated by means of the coupling plate;

Fig. 14 is a section on line 14—14 of Fig. 8 through the same cam roller as viewed from a different angle;

Fig. 15 is a section on line 15—15 of Fig. 8 showing how the cartridge case extractor fits into a slot in the hinge's left portion;

Fig. 16 is a section on line 16—16 of Fig. 8 showing the relationship of the extractor, the cam plate and other parts;

Fig. 17 is a view corresponding to Fig. 8 but differing therefrom in that the breech mechanism parts are shown in the breech block unlocked or "intermediate" handle position of Figs. 6 and 7;

Fig. 18 is a section taken from line 18—18 of Fig. 17 to show the manner in which the breech actuating and other parts are maintained in operative association by means of a single housing cap;

Fig. 19 is a section on line 19—19 of Fig. 17 showing the relationship of the breech actuating extractor and cartridge case retention means when the cam plate has been moved to the breech unlocked position by the operating handle;

Fig. 20 is a section along line 20—20 of Fig. 7 showing the breech block, extractor, and cartridge case supporting detent as same appear when the breech block is partially withdrawn from the chamber;

Fig. 21 is a view which shows the cam plate undercut at the same level shown in Fig. 11, except that in the Fig. 21 illustration the breech block has been opened to the position represented in Fig. 20;

Fig. 22 is a right side view of the gun breech end with the breech block and associated parts shown fully withdrawn;

Fig. 23 is a rear elevation of the gun showing the breech block and associated mechanism in the "fully opened" position;

Fig. 24 is a section on line 24—24 of Fig. 23 showing the cartridge case head being moved past the detent by which the case is held in the fully loaded position;

Fig. 24A is a view similar to Fig. 24 but showing how the detent supports the head of the cartridge case when the latter is in the fully loaded position; and Fig. 25 is a view taken from line 25—25 of Fig. 23 to show the gun's case holding detent installed in a liner lug slot.

*The complete recoilless gun*

The inventive improvements hereof are illustratively here disclosed as being incorporated in a military weapon of 105 mm. caliber capable of a completely recoilless firing of projectiles (not shown). As explained at length in the aforementioned parent application, the illustrated gun is of extremely light weight and may be fired from a small vehicle such as the well known "jeep" (not shown), or from the bi-wheel carriage mount 63, or even from a tripod support (not shown). The illustrated gun support 63 of Fig. 1 utilizes hand wheels 64 and 65 for enabling the weapon accurately to be positioned both in azimuth and in elevation. When supported in the named or other equivalent manner the new gun may with complete safety to the user be fired with great accuracy and high military effectiveness.

As the present application is intended to disclose the breech, extractor and detent case holder mechanisms primarily, the remainder of the gun will only be described in the present application in sufficient detail so as to orient an understanding of the breech and associated parts.

The illustrative recoilless gun here shown comprises a barrel 66; an enlarged chamber 67 secured to the rear of this barrel and having the tapered shape represented; a removable liner 68 secured in the rear of the chamber; a breech block 70 partially closing the rear opening of the liner; a hinge bar support 71 for the breech block; and an operating handle 72 for that support. Also included, but not to be described in the present application, are a trigger (not shown) and housing therefor for firing the weapon, and a sight 74 for aiming the gun in conventional manner.

The ammunition usable with the illustrated gun is similar to that first disclosed in the aforementioned pending application Serial No. 536,590 and includes the "perforated cartridge case" shown at 77 in the drawings hereof. This ammunition (the projectile of which is not shown) is loaded into the illustrated weapon from the breech thereof in a manner presently to be explained.

*The breech block and chamber reliner*

The rear or breech end of gun chamber 67 is provided with a removable ring-shaped "reliner" 68 which serves to prolong the weapon's useful life in the manner taught by co-pending Musser application Serial No. 628,647. Attachment of this reliner to the chamber interior is effected through threads 84 which provide with the chamber a juncture of axial length sufficient to afford a gas-tight seal without gasketing. In the installed position shown, reliner 68 is prevented from turning with respect to chamber 67 by two sets of cap screws 76 and 79 which extend through the chamber wall into the reliner in a manner shown by Figs. 3 and 4. These cap screws further hold a hinge block (later to be described) against the chamber's right side.

As the drawings show, the gun's breech block 70 is removably secured within the rear of chamber reliner 68 and constitutes only a partial closure therefor (see Figs. 2, 7, 12, 17, and 23). This member 70 takes the form of a cylindrical block which is radially spaced from the inner wall of reliner 68 in a manner to form a substantially annular orifice or venturi 85 that leads from the chamber's interior to the rear exterior of the gun. Figs. 2, 7, and 23 show that this annular orifice is divided into four sections; and the same views plus Figs. 8, 17, and 22 show that the breech block tapers inwardly from front to rear.

The outer rear contour of each of these four orifice sections 85—85*a* is defined by the removable reliner 68, as Figs. 2, 7, 8, and 17 clearly show. Only the inner rear contour of each of these orifice sections is defined by the tapered breech block 70. A major portion of erosive wear is therefore received by the replaceable reliner (in a manner earlier disclosed by co-pending Musser application Serial No. 628,647) leaving the breech block relatively free from harmful effects by the powder combustion gases which escape through orifice openings 85—85*a*.

Four locking lugs shown at 86 in each of Figs. 2, 7, 8, 17, and 22 extend radially from the central body portion of breech block 70 (as taught by co-pending applications Serial Nos. 536,590 and 577,830) and interfit with mating protrusions 87 (again see the figures just named) on the reliner wall interior (as taught by co-pending application Serial No. 628,647). Each locking lug 86 carries threads on the periphery thereof, as best shown in Figs. 12, 19, and 23, and each mating protrusion 87 is provided with similar threads at 88 in Fig. 23. When these two sets of threads are engaged as shown in Figs. 8 and 12, they securely lock the breech block 70 within the rear interior of chamber reliner 68.

The chamber reliner wall spaces which circumferentially separate the locking protrusions 87 have a diameter larger than the maximum for the breech block lugs 86, and this relation enables free longitudinal movement by these lugs through the spaces named. This movement is utilized in inserting the breech block within the chamber reliner and also in withdrawing the block therefrom, all in a manner presently to be described.

When inserted and locked within the chamber reliner 68, as shown in Figs. 2, 8, and 12, this breech block 70 constitutes a firm support for the ammunition which it helps to position within the weapon. The steel of the central core structure is of sufficient thickness and strength to withstand, with a factor of safety of well over two, the maximum rearward stress exerted thereon during firing.

It will be noted from Fig. 12 that when an ammunition round has been loaded into the gun the ammunition's cartridge case 77 is supported centrally with respect to the walls of chamber 67 therearound. Such central positioning is important for reasons clearly set forth in the aforementioned parent application, and is effected by the rear chamber reliner 68 constituting the represented opening through which the projectile (not shown) and cartridge case 77 are inserted in loading the weapon. The breech block 70, moreover, has a mating recess which further received the cartridge case head 97 during loading, and upon locking of the block in position (as shown in Figs. 2, 8, and 12) abuts against the case head thereby restraining same against backward movement.

*The annular breech orifice and recoil neutralization*

The 105 mm. recoilless gun illustratively here shown effects recoil neutralization in the unique manner taught by co-pending Kroeger-Musser application Serial No. 536,590; that is, the forces of rearward reaction are neutralized by forwardly acting counterforces produced by rearward escape of generated powder gas through the earlier indicated annular orifice openings 85—85*a* (see Figs. 2, 7, 8, 17, and 23) between the gun's breech block 70 and the rear interior of chamber reliner 68 wherein this block is secured.

As is most clearly illustrated by Figs. 2, 7, 17, and 23, this annular orifice extends all the way around the breech block's central core and is obstructed only by the four radial lugs 86 which engage with the four mating protrusions 87 of chamber reliner 68. All circumferential space between these lugs thus constitutes the named annular orifice 85—85*a* (see Figs. 2, 7, 8, and 17) which lead from the interior of chamber 67 rearwardly to the exterior of the gun.

Co-pending Kroeger-Musser application Serial No. 536,590 explains that for complete neutralization of recoil there exists an optimum ratio between the bore area of the gun's barrel 66 and the throat area of the breech orifice openings 85—85*a*. In the improved gun here illustratively disclosed, the chamber reliner 68 which is employed is manufactured to specifications which include the predetermined optimum ratio for practically zero recoil, and it therefore needs no adjustment when installed in the gun. The gun's operation and performance follow principles more fully enunciated by co-pending Musser application Serial No. 628,647 by which use of this replaceable type of chamber reliner was first proposed.

*Improved features of mechanical design*

The 105 mm. recoilless weapon here shown in provided with a breech mechanism which incorporates a number of significant and highly practical improvements. In addition, the novel weapon is provided with a positive-action cartridge case extractor, and a detent case holding means. These improvements make it possible to reduce the time and skill required to safely load round after round of ammunition into the weapon; they insure trouble-free operation under all service conditions, including the most adverse; they impart double-safety features to all critical part operations; they assure compactness plus simplicity of assembly and are so "foolproof" as to make incorrect assembly impossible; and they accomplish the foregoing without sacrificing the advantages of light weight, minimum number of parts, ruggedness and simplicity of action.

The essential breech operating parts involved include the breech block 70 earlier mentioned; the operating handle 72 supported from the right rear of gun chamber 67 through hinge block 83; the hinge bar 71 through which rearward movement of handle 72 effects withdrawal of breech block 70 from the chamber; a hammer housing 105 (see Figs. 8 and 17) which supports breech block 70 from hinge bar 71 in a manner permitting block rotation; a plate-like coupling ring 106 through which locking and unlocking rotations are transmitted to block 70; a cam plate 107 (see Figs. 8, 12, 17, 18, 19, 20, 21, and 24) which effects rotation of the breech block in response to movements of handle 72; and a housing cap 109 which holds together breech block 70, coupling ring 106 and plate cam 107 in a manner which permits block rotation and also permits the plate cam to slide.

*The breech block's hinge mounting*

Explanation has already been given of how the breech block 70 is secured in the rear of chamber 67 by the aid of that block's locking lugs 86 and the mating protrusions 87 on the interior of reliner 68. In the "engaged" position represented by Figs. 1, 2, 8, and 12, this support is all that is needed to hold the breech block in place, and it is fully adequate to restrain the maximum chamber pressure which combustion of the propellent charge (not shown) sets up.

To facilitate loading removal of the cartridge case 77 after firing, provision is made for releasing this breech block 70 from its chamber reliner attachment, rearwardly withdrawing it from the chamber 67 and swinging it out of alignment with the chamber interior to the right-hand position shown by Figs. 22—23. The earlier mentioned hinge bar 71 comes into play during these actions.

The right end of this bar fits into hinge block 83 in the manner shown by Figs. 1, 1A, 2, 8, 12, 17, and 19 to 24 inclusive. As earlier mentioned the block 83 is securely bolted to the right rear of gun chamber 67. Aiding this attachment are cap screws 79 (see Figs. 3–4) earlier mentioned, plus a companion pair of cap screws 112 at the block's front, plus a third pair of cap screws 76 at the block's rear also extending through chamber 84 and into reliner 68, plus a fourth pair of cap screws 114 holding the hinge block's rear flange against the end of chamber 67 as shown in Figs. 2, 7, 8, 17, and 23. Contributing to this mounting is the lower end of handle 72 which projects downwardly through the hinge block 83 and engages with mating openings in upper and lower portions 71*a* (see Fig 21) of the hinge bar, as best shown by Figs. 4 and 5. This juncture enables the bar 71 to hinge around handle shaft 72*a* (see Figs. 9, 10, 11, 19, 20, 21, and 24) from the fully closed position of Figs. 1 and 2 progressively through the Fig. 20 position to the fully opened position of Figs. 22 and 23.

Once assembled, as shown in Fig. 5, the handle shaft 72*a* is held in place by interfitting of cap screws 76 into the represented mating slots of the shaft. This holds the working parts in their proper place and at the same time facilitates disassembly and reassembly, as will later be explained.

*Breech block rotation by handle movement*

All rotations necessary to lock and unlock breech block 70 are imparted thereto by the gun's operating handle 72 through mechanism which will now be described. In the fully closed and locked position of Figs. 1 and 2 and related views the handle 72 is at its limit of forward travel; in the block closed but unlocked position of Figs. 6, 7, and 17 the handle 72 has been moved rearwardly to its intermediate position; and in the fully withdrawn block position of Figs. 22 and 23 the handle has been further moved rearwardly and to the right to its limit of rearward or opening travel.

For transmitting the named rotative movements from handle 72 to the block 70 use is made of the earlier mentioned cam plate 107 which is slidably housed in and surrounded on all sides except the front by the hinge bar 71; the coupling ring 106 which carries a pair of diametrically opposed pins 117 (see Figs. 8, 13, 14, and 17) extending at their forward ends into mating slots 118 (see Fig. 8) in the breech block and engaging at their rear ends with a pair of inclined slots 119 and 120 (see Figs. 8 and 17) in the forward face of the laterally movable cam plate 107; and a dog 121 (see Figs. 3, 5, 8, and 17) which is keyed to handle shaft 72*a* at 122 (see Figs. 12 and 19) and which carries on its rear side a pin 123 (see Figs. 8, 12, 17, 19, 20, and 24) which engages with mating slot 124 in the extreme right end of cam plate 107.

Through this dog 121 and pin 123 rotative movements of the gun's operating handle are translated into lengthwise movements on the part of cam plate 107. Thus, when handle 72 occupies the extreme forward position of Figs. 1, 2, 8, and 12, the cam plate 107 is moved to its extreme left position in hinge bar housing 71; however, upon rearward movement of the handle to the intermediate position of Figs. 6 and 7 the cam plate 107 is pulled by dog pin 123 to the extreme right position shown by Figs. 17, 19, 20, and 24. Return of handle 72 to the forward position of Figs. 1 and 2 pushes the cam plate back to the extreme left position of Figs. 8 and 12.

In so moving endwise with respect to the hinge bar housing 71 the cam plate 107 imparts to breech block 70 the desired locking and unlocking rotative motions. As earlier indicated, the conversion of endwise movement by cam plate 107 into rotative movement by breech block 70 is accomplished through the medium of cam plate slots 119—120, cooperating pins 117 that extend into the breech block, and coupling plate 106 that holds these pins in such a way as to absorb all lateral thrust exerted on the pins and to impart only rotative motion to the breech block.

The locked or fully closed position of breech block 70 is effected when the cam plate is in its extreme left position as shown by Fig. 8. Movement of the cam plate towards the right causes pins 117 to slide in slots 119—120 in such a way as to rotate the breech block counterclockwise to the unlocked position of Figs. 7 and 17. Return of the cam plate to the extreme left position of Fig. 8 rotates the breech block clockwise back to the locked position of Figs. 1, 2, and 8.

By reason of the coupling ring 106 absorbing all side thrust and by further reason of the pins 117 carried by this plate extending into the oblong openings 118 in the breech block, that block is kept free to occupy the central position so essential for free rotation and easy action of the gun parts.

It will be noted that whereas cam plate slot 119 is straight the companion slot 120 is curved. This curvature is made necessary by the arc through which breech block pins 117 travel during the rotative actions named. The curvature could, of course, be equally divided between slots 119 and 120, but for reasons later to be made evident it is preferred to keep slot 119 straight and allot all of the required curvature to slot 120. Without this curvature, binding or jamming of the parts would result to such an extreme degree as to make desired operation impossible.

*Hinge opening and closing by handle movement*

To swing the hinge bar 71 and associated parts outwardly from the closed position of Figs. 1, 2, 8, etc, to the open position of Figs. 22–23 it is necessary only to swing handle 72 from the intermediate position of Figs. 6 and 7 to the extreme limit of opening travel shown by Figs. 22 and 23. Opening of the hinge structure starts only after handle 72 has been pulled backwardly beyond the intermediate position of Fig. 7. In that intermediate handle position the hinge structure parts are shown by Figs. 17 and 19. Under this condition the cam plate 107 has been moved by dog 121 and pin 123 to the extreme right hand position shown by Fig. 17; and a flat portion of the dog has now been rotated into abutting contact with cam plate 107 as indicated at 127 in Fig. 19. As earlier explained, the breech block 70 occupies the "unlocked" rotative position of Figs. 17 and 19, and in all respects the hinge structure is now completely free for withdrawal from the gun chamber 67.

Such withdrawal is effected by further rearward movement of handle 72 from the intermediate position of Figs. 6–7 to the extreme open chamber position of Figs. 22 and 23. By reason of the contact 127 between dog 121 and cam plate 107 which Fig. 19 indicates, further counterclockwise rotation of that dog is directly transmitted to hinge structure 71. Hence, the further backward handle movement just named swings the hinge structure around the lower portion of handle 72 as a turning point.

This swinging first withdraws the left end of hinge bar 71 from engagement with trigger mechanism (not shown) and then moves the hinge bar to the fully open position (cf. Figs. 20, 22, 23, and 24). Upon arriving at this fully open position further movement of both handle 72 and hinge bar 71 is arrested by contact of the right end of that bar with the hinge block 83 as indicated at 128 in Fig. 24.

The hinge bar 71, breech block 70 and other associated parts are now fully withdrawn from the gun chamber 67 as shown by Figs. 22 and 23. Insertion of an ammunition round (only the cartridge case 77 thereof is shown) into the gun chamber, or withdrawal of a fired cartridge case 77 from that chamber now becomes possible. In this fully open position, moreover, the rounded exterior of hinge block 83 is accommodated by the recesses 129 in the extreme right end of cam plate 107 shown in Figs. 8, 16, and 17.

The progression by which this mating is accomplished is represented by Figs. 21 and 24. Fig. 21 shows how a portion of the cam plate 107 is cut away through a circular contour 129 which accurately matches the radius of hinge block 83's curved exterior. As the hinge bar 71 is rotated by handle 72 from the closed breech position of Fig. 17 to the open position, the cutaway portion 129 of cam plate 107 swings around the outside of hinge block 83 as shown by Fig. 21.

In order to close the hinge structure, it is now necessary only to return handle 72 from the fully open position of Figs. 22 and 23 back to its intermediate position of Figs. 6 and 7. Such operation of the handle rotates dog 121 clockwise thereby causing pin 123 (see Figs. 8 and 17) to exert on slot 124 in cam plate 107 a force tending to push the cam plate toward the left end of hinge bar 71. By reason, however, of the mating engagement 129 of cam plate 107 with the rounded exterior of hinge block 83, movement of the plate cam in hinge bar 71 is rendered impossible, and instead the force exerted by the dog pin 123 is converted into a torque exerted on the entire hinge structure in a way that rotates same around the lower portion of handle 72 as a turning point.

This rotation is clockwise and it progressively advances the hinge structure from the fully open position of Figs. 22 and 23 to the closed hinge position of Figs. 7, 8, and 17. In this closed hinge position the left end of hinge bar 71 has re-engaged with the aforementioned trigger mechanism (not shown). The breech block 70 continues to occupy the unlocked rotative position of Figs. 7 and 17; the cutaway portion 129 of plate cam 107 has disengaged itself from the circular exterior of hinge block 83 as shown in Fig. 17; and the cam plate 107 and cooperating parts are now again occupying the positions best indicated by Fig. 17. Under these conditions handle 72 occupies the intermediate position represented by Figs. 6 and 7.

As handle 72 is further advanced to its extreme of forward travel, as shown in Figs. 1 and 2, the following actions take place. Cam plate 107 is by dog 121 and pin 123 moved from the extreme right position of Fig. 17 to the extreme left position of Fig. 8. In consequence of this movement cam plate slots 119 and 120 rotate breech block 70 clockwise causing the four peripheral locking lugs 86 to move into mating engagement with the chamber liner protrusions 87 and thereby secure the breech block in the rear of gun chamber 67 as shown by Figs. 2 and 12.

In addition, the cam plate 107 and other mechanisms (not shown) cooperate to actuate trigger and firing mechanisms (not shown). The details of this action are fully described in the aforementioned parent application. It will here suffice to say that the same handle 72 and hinge bar 71 movements which open, close, lock and unlock the breech block 70 simultaneously prepare the firing mechanism for operation.

*The cartridge case extractor*

A new and improved cartridge case extractor also has been incorporated in the recoilless gun here disclosed. This extractor is shown at 147 in each of Figs. 8, 12, 17, 19, 20, and 23. It comprises the represented T-shaped member 147 carrying on the stem end thereof a hook 148 which at proper times engages with the rim 97 of cartridge case 77 as shown in Fig. 20, whereby opening of the hinge structure following each firing effects a positive withdrawal of the cartridge case from the gun chamber 67.

The base of this extractor 147 is carried in a slot 149 (see Fig. 20) in the inner face of hinge bar 71. An internal spring 150 (see Figs. 12 and 20) of the compression type urges a plug 151 (again see Figs. 12 and 20) against the base of this slot 149 and thereby exerts upon the extractor a force tending to bias it from the inactive position of Fig. 12 to the active position of Fig. 20. A recess 162 (see Figs. 20 and 25) in the chamber liner 68 accommodates this extractor when the breech hinge structure is closed.

From Figs. 8 and 17 it will be seen that the cam plate 107 is provided with a longitudinal slot which permits axial movement of the cam plate without direct interference with the extractor. Fig. 12 further shows, however, how the right portion of cam plate 107 holds the right toe of the extractor firmly against the hinge bar 71 when the cam plate occupies the extreme left position of Figs. 8 and 12.

When, however, the cam plate is moved to the extreme right position of Figs. 17 and 19 an angular groove portion 152 of the cam plate body (see also Figs. 17 and 19) moves over the left toe of the extractor 147 while the right end of the cam plate completely clears the right extractor toe, as shown in Figs. 17, 19, and 20. In the former condition the extractor 147 is held inactive with the hook portion 148 thereof away from the periphery of the cartridge case rim 97; in the latter condition freeing of the extractor's right toe allows spring 150 to urge the member about the left toe as a fulcrum and thereby bring the extractor hook 148 into contact with the cartridge case rim 97 as shown in Fig. 20.

Under this condition withdrawal from the gun chamber of the breech block 70 and other hinge-carried parts causes the extractor hook to pull the cartridge case out of the gun in the general manner indicated by Fig. 20. This withdrawal is both positive and reliable. At all times when the extractor is not needed, however, the action thereon by cam plate 107, which Figs. 12 and 19 illustrate, positively assures that the extractor will be held completely out of the way.

A further function of the extractor 147 when in the tilted position of Fig. 20 is to aid in blocking cam plate 107 against movement out of the extreme right position shown by that figure. Such blocking is effected by the right extractor toe in the manner indicated, and it supplements the cam plate-to-hinge block engagement of Figs. 21 and 24 in coupling the hinge bar 71 directly to handle 72 during hinge closing movement by that handle.

*The detent cartridge case holder*

In loading weapons of the heavy caliber type exemplified by the gun 66—67 here shown, it frequently is desirable to hold the weapon at a selected firing elevation continuously between firings. One such elevation is indicated generally by Fig. 1. Ammunition rounds such as are used in heavy caliber type guns typically are heavy and, when thrust into a so elevated gun, they have a tendency to slide back out of the gun chamber before the breech block 70 can be closed and the weapon otherwise fully conditioned for firing.

In conventional artillery pieces (not here shown) the projectile rotating bands are non-preengraved, and to counteract the named tendency the rear of the rifled barrel's bore is outwardly flared to constitute a "forcing cone" (not here shown) into which the projectile band is wedged by the forward loading thrust sufficiently to prevent rearward sliding of the round prior to breech block closure. However, with preengraved ammunition of the type represented in the drawings (of which only cartridge case 77 is shown), this "forcing cone" expedient cannot be availed of and a loading problem is therefore presented by the weapon here disclosed.

In order to solve this loading problem, the improved gun here shown is still further provided with a detent which restrains the inserted cartridge case from sliding back out of the weapon until such as final withdrawal of the fired case arrives. This detent is shown at 154 in Figs. 12, 19, 20, 23, and 24.

In the improved form shown the main detent member 154 is rotatably mounted on a fulcrum 155 having end tongues 156 insertable into the slots 157 made in opposite sides of the detent accommodating opening 162 which Figs. 12, 20, and 25 show to have been cut in the chamber locking protrusion 87 there represented. This opening 162, it will be seen, accommodates not only the detent 154 but also the case extractor 147 when the breech block carrying hinge bar 71 occupies the closed position of Figs. 12 and 19.

By means of an internal spring shown at 158 in Fig. 12 the free or forward end of the detent 154 is urged toward the cartridge case rim. This urging results from a force couple set up by the compression spring 158 through pin 159 which the spring forces against one side of the represented V slot 160 in the fulcrum 155. As earlier indicated the fulcrum is prevented from rotating between engagement of its end tongues 156 with the slots 157 in the side walls of the detent accommodating groove.

The action of the complete detent mechanism in loading the gun is best illustrated by Figs. 20, 24, and 24A. With the breech block 70 and hinge structure 71 fully withdrawn from the gun chamber the detent 154 moves to the position shown in Fig. 20. As the cartridge case 77 is inserted into the chamber the case rim 97 pushes the detent back slightly, as shown in Fig. 24. After the case rim passes the contacted detent agent, the spring action earlier named restores the detent to the position of Fig. 24A where it blocks the cartridge case from sliding back out of the gun chamber.

As the hinge bar 71 with supported parts is now closed by the before explained operation of handle 72, the extractor 147 approaches the detent in a relationship similar to that shown by Fig. 20. Further hinge closing movement brings the extractor into contact with the inner face of the detent and progressively pushes the detent to the inactive position shown by Figs. 12 and 19. The breech block 70 has meanwhile been brought into abutment with the cartridge case head and the ammunition round is now prevented by the breech block from sliding out of the gun.

The detent construction here disclosed not only accomplishes its intended purpose in a reliable and satisfactory manner, but it also offers significant advantages in the way of simplicity plus ease of assembly and disassembly. The entire detent assemblage can be fully withdrawn from the gun by moving the fulcrum 155 to the left in Fig. 24 and completely out of tongue slots 157. Restoration of the assemblage to the operative position shown is equally simple. Moreover, the individual parts of the assemblage are easily taken apart and put together.

Once the case detent assemblage is withdrawn from the gun, all compponent parts may readily be disassembled without the aid of tools. The mounting fulcrum 155 is first rotated so that the V-slot 160 therein is completely out of register with the pin and spring bore. This rides the pin end on the fulcrum's unslotted circumference and first frees the fulcrum for sidewise withdrawan from the detent body 154 and then frees the pin and spring for lengthwise withdrawal of the detent body recess.

Re-assemblage is equally simple, and it also requires no tools. The spring 158 and pin 159 are first placed in the detent recess; one of the end tongues 156 of fulcrum 155 is inserted beneath the end pin 159 and rotated to compress spring 158 and ride the pin end on the tongue side (fulcrum's full circumference); and with the parts so placed the fulcrum is thrust endwise into and centered with respect to the detent body. Fulcrum slot 160 is next so rotatively related to the pin end that following reinsertion of the fulcrum tongues into the detent mounting slots 157, operation in the intended manner of Figs. 24 and 24A is at once made available.

It will be noted that springs 158 and 150 of the detent 154 and of the extractor 147, respectively (see Fig. 12), are identical in size and design, and further that the detent and extractor pins 159 and 151 also are identical. Interchangeability of these parts thus is provided. Hence, should extractor spring 150 break or should either it or extractor pin 151 become lost, replacement by the corresponding parts borrowed from the detent 154 immediately becomes possible. This effectively assures that the extractor need not remain out of commission due to spring breakage, a very valuable advantage when the gun is being used in the field.

Moreover, the novel extractor and detent organization here shown offers a further unique advantage. Backing the extractor 147 as it does (see Figs. 12 and 19), the detent 154 transfers its spring pressure to the extractor through the direct contact represented. This pressure is in the same direction as that which the extractor spring 150 exerts. Hence, should spring 150 fail, the necessary biasing of the extractor may be provided by the detent spring 158 without transfer, as just stated.

*Operation of the breech, case extractor and case holder mechanisms*

From the foregoing it will be seen that there have been provided improvements for recoilless guns which offer important advantages in connection with both loading and firing. To place the ammunition round (only the cartridge case 77 thereof is shown) within the weapon, it is merely necessary to pull operating handle 72 to its extreme rear position thereby unlocking breech block 70 withdrawing it from chamber 67 and further swinging it completely free of the chamber opening, as shown in Figs. 22 and 23.

The ammunition round is now inserted into the opened chamber and the rear of the barrel's bore. As the projectile (not shown) enters the barrel, and the preengraved rotating bands thereon are aligned with the grooves of the barrel bore (also not shown), forward thrust is given to the round and continued until the rim of the cartridge case head 97 abuts with the mating shoulder on chamber liner 68, as shown in Fig. 12. Case detent 154 now holds the ammunition round in this position, as shown in Fig. 24A.

The breech block 70 is now moved to the closed position by swinging handle 72 to its extreme forward position wherein locking of the breech block 70 in the chamber takes place and other actions earlier described in detail also are performed. In approaching and engaging with the cartridge case head 97 the flared recess in the breech block's front comes into abutment with the head and thereby directly restrains the case against rearward movement.

After the ammunition round is fired (by means not here shown or described, but amply illustrated and described in detail in the aforesaid parent application) it becomes necessary to open the breech block, withdraw the cartridge case 77 and thus prepare the gun for reloading. This is done by merely swinging handle 72 to the extreme rear position of Figs. 22, 23 and 24, thereby unlocking the breech block 70 and withdrawing same from the chamber 67. As this withdrawal is made the extractor fixture 147 pulls the fired case 77 sufficiently out of the chamber (see Fig. 20) to make full manual removal easily possible.

It will be understood from the foregoing description and accompanying illustration (and even more so from the aforesaid parent application) that the design of the present gun offers a minimum of opportunity for unauthorized tampering by the gun user, thereby contributing to the advantages of safety. All the moving parts are easily assembled and (including the firing mechanism not described in the present application) are enclosed in the hinge bar 71 and in other ways, and hence are safeguarded from mechanical injury or unauthorized contact.

Similar safeguards are incorporated in the extractor 147 and the case loading detent 154. It has already been seen how the extractor is by cam plate 107 positively held in the inactive position as long as the cam plate occupies the extreme left position of Fig. 12; and also how shifting of the cam plate 107 to the extreme right position of Figs. 17 and 19 renders the extractor 147 effective for engagement with the cartridge case rim 97, as shown in Fig. 20.

It has further become apparent how extractor 147 functions in holding the case loading detent 154 in the inactive position of Figs. 12 and 19 at all times except when the hinge carried breech block 70 is withdrawn from the gun chamber as in Fig. 20. This unique coordination contributes to the foolproof manner in which the extractor and the detent perform their intended functions with the highest reliability.

In consequence of the above described constructions the breech, case extractor, and case holder mechanisms are capable of withstanding rough handling and other abuse, and provide trouble-free operation under all service conditions, including the most adverse.

*Summary*

The earlier described qualities of superior breech operating, case extractor and case holding mechanisms are the direct result of the several improvements here disclosed. The individual features of such improvements are numerous, and in the complete weapon these features effect the named result through cooperations and interactions that are both unique and novel.

It will by now have become apparent that these improvements in breech operating, case extractor, and case holding mechanisms may also be applied to guns of sizes, characters, and shapes other than the one here disclosed, and that the represented 105 mm. open-breech weapon thus has been chosen only to illustrate and not to limit the inherently wide application and scope by which these improvements are characterized.

From the foregoing it will thus be seen that the here disclosed improvements have enabled the provision of superior breech, case extractor and case holder mechanisms in heavy caliber recoilless guns which incorporate principles of construction previously disclosed and claimed by the four co-pending applications earlier listed herein; that these same improvements have made available a unique gun construction which reduces the time and skill required safely to load recoilless weapons of heavy caliber typfied by 105 mm. barrel diameter; that the improvements have resulted in simplifying the structure and reducing the number of parts needed by the gun's breech and related mechanisms and have provided a uniquely compact arrangement for those parts; that they have enabled such complete enclosure of the breech mechanism parts as will assure trouble-free operation under all service conditions including the most adverse; and that they have provided for the guarding of all critical parts of the breech operating, case extractor, and case holding mechanisms against possible mechanical damage due to rough handling and other abuse.

The inventive improvements here disclosed thus are capable of wide application and hence are not to be restricted to the specific form here shown and described by way of illustration.

I claim:

1. In a gun comprising a barrel whose muzzle may be elevated above the breech during loading, the combination of a chamber extending forwardly from the barrel's breech and being adapted to receive an ammunition round that includes a cartridge case with a rear head rim, a breech block concentric to said chamber and movable in an arcuate path into and out of the rearward portion of said chamber behind the head of the cartridge case when fully inserted and being secured in said chamber when rotated to a locked position and freed for withdrawal from said chamber when rotated to an unlocked position, a detent arm disposed in the rear of said chamber, resilient means causing said detent arm to latch over the rear rim of the cartridge case upon full forward insertion of the case into said chamber whereby then to hold the thus loaded case against backward sliding from said chamber's open rear due to the aforesaid barrel elevation or other cause, and means responsive to insertion of said breech block into the rear portion of said chamber behind the so-held case for disengaging said detent arm from the head rim whereby then to free the case for subsequent removal from said chamber after said breech block has later been withdrawn.

2. In a gun comprising a barrel whose muzzle may be elevated above the breech during loading, the combination of a chamber extending forwardly from the barrel's breech and being adapted to receive an ammunition round that includes a cartridge case with a rear head rim, a breech block concentric to said chamber and movable in an arcuate path into and out of the rearward portion of said chamber behind the head of the cartridge case when fully inserted, a detent arm disposed in the rear of said chamber, resilient means causing said detent arm to latch over the rear rim of the cartridge case upon full forward insertion of the case into said chamber whereby then to hold the thus loaded case against backward sliding from said chamber's open rear due to the aforesaid barrel elevation or other cause, an extractor movable into and out of said chamber with said breech block and aligned with said detent arm when in said chamber, and means including said extractor for disengaging said detent arm from the case head upon insertion of said breech block into the rear portion of said chamber behind the so-held case whereby then to free the case for subsequent removal from said chamber after said breech block has later been withdrawn.

3. In a gun comprising a barrel whose muzzle may be elevated above the breech during loading, the combination of a chamber extending forwardly from the barrel's breech and being adapted to receive an ammunition round that includes a cartridge case with a rear head rim, a breech block concentric to said chamber and movable in an arcuate path into and out of the rearward portion of said chamber behind the head of the cartridge case when fully inserted and being secured in said chamber when rotated to a locked position and freed for withdrawal from said chamber when rotated to an unlocked position, a hinge bar extending radially from the center of said breech block to a hinge support on one side of the rear chamber wall and permitting rotative movement of said breech block within said chamber plus complete withdrawal therefrom, a detent arm disposed in the rear interior of said chamber in radial alignment with said hinge bar, resilient means causing said detent arm to latch over the rear rim of the cartridge case upon full forward insertion of the case into said chamber whereby then to hold the thus loaded case against backward sliding from said chamber's open rear due to the aforesaid barrel elevation or other cause, and means carried by said hinge bar for disengaging said detent arm from the case head upon insertion of said breech block into the rear portion of said chamber behind the so-held case whereby then to free the case for subsequent removal from said chamber after said breech block has later been withdrawn.

4. In a gun comprising a chamber adapted to receive an ammunition round that includes a cartridge case with a rear head rim, a breech block concentric to said chamber and movable in an arcuate path into and out of the rearward portion of the chamber behind the head of the cartridge case when fully inserted, a hinge bar extending radially from the center of said breech block to a hinge support on one side of the rear chamber wall, a detent arm disposed in the rear of the chamber in radial alignment with said hinge bar, a detent spring causing said arm to latch behind the rear rim of the cartridge case upon full forward insertion of the case into said chamber whereby then to hold the thus loaded case against backward sliding from said chamber pending movement of said breech block thereinto, and an extractor carried by said hinge bar and movable into and out of the chamber with said breech block for the purpose of establishing a withdrawing engagement with the case head rim at proper times, said extractor being rotatively aligned with said detent arm when in the chamber and then so abutting said arm as to push the arm outwardly away from the case head rim against the force of said detent spring, the relation of said extractor to said detent arm further being such that said detent spring force thus absorbed by said extractor urges the extractor towards the case head rim in a way to establish withdrawing engagement of said extractor with the rim whenever said breech block and said hinge bar are withdrawn from said chamber.

5. In a firearm whose breech end is provided with a hinge bar secured to the firearm so as to be selectively swingable toward and away from the firearm's breech opening, such firearm utilizing ammunition including a cartridge case insertable a limited amount into the firearm's ammunition chamber and extractable therefrom after firing of the ammunition, the combination of: detent means situated in the firearm's ammunition chamber, said detent means being pivotably movable relative to the ammunition chamber and being operable to engage releasably with the cartridge so as positively to hold that case inserted to the fullest extent and seated in the ammunition chamber when the hinge bar is away from the firearm's breech opening; and an ammunition extractor carried by the hinge bar, said extractor being in alignment with said detent means, said extractor being operable to abut and to pivotally move said detent means out of engagement with the cartridge case when the hinge bar is swung toward the firearm's breech end, and said extractor being operable to engage said cartridge case and to extract that case from the firearm when the hinge bar is swung away from the firearm's breech end.

6. A breech mechanism for a gun which gun utilizes an ammunition round including a cartridge case, which case is insertable a limited amount into the gun's ammunition chamber and which case is extractable therefrom after the round is fired, such mechanism comprising: a hingle bar attached to the gun so as to be selectively swingable across the gun's ammunition chamber to opened and closed positions, said hinge bar being releasably lockable in the closed position; a T-shaped cartridge case extractor carried by said hinge bar, said extractor being movable in said hinge bar, when that hinge bar is swung to the opened position, to engage the cartridge case for sufficient time to extract that case from the ammunition chamber; and a plate in said hinge bar, said plate being slidable relative to that bar and relative to said extractor and serving, when slid in one direction, to limit movement of said extractor in said hinge bar, and serving, when slid in the opposite direction, to latch over said extractor so as to prevent the extractor's movement in said hinge bar.

7. A breech mechanism for a gun, which gun utilizes an ammunition round including a cartridge case, which case is insertable a limited amount into the gun's ammunition chamber and which case is extractable therefrom after the round is fired, such mechanism comprising: a hinge block attached to the gun; a hinge bar interfitting, at one end, with said hinge block so as to be selectively swingable across the gun's ammunition chamber to opened and closed positions, said hinge bar being releasably lockable in a closed position; an operating handle, one end of which fits as a hinge pin through said hinge block and through that portion of said hinge bar which interfits with that hinge block and the other end of which handle is accessible so that said handle can be rotated in said hinge block and said hinge bar; a T-shaped cartridge case extractor carried by said hinge bar, said extractor being movable in said hinge bar, when said hinge bar is swung to the opened position, to engage the cartridge case for sufficient time to extract that case from the ammunition chamber; a plate in said hinge bar, said plate being slidable relative to that bar and relative to said extractor and serving, when slid in one direction, to limit movement of said extractor in said hinge bar, and serving, when slid in the opposite direction, to latch over said extractor so as to prevent the extractor's movement in said hinge bar; and a dog secured to that portion of said operating handle which extends through said hinge bar so as to be rotatable in unison with said operating handle, said dog being in operative engagement with said plate so that rotation of said dog through the agency of said operating handle causes that plate to be moved slidably in said hinge bar, and said dog also serving, when rotated through the agency of said operating handle, to swing said hinge bar to the opened and the closed positions.

References Cited in the file of this patent

UNITED STATES PATENTS

| | | |
|---|---|---|
| 520,029 | Bergman et al. | May 22, 1894 |
| 637,110 | Haeseler | Nov. 14, 1899 |
| 879,225 | Wheeler | Feb. 18, 1908 |
| 1,294,240 | Cooke | Feb. 11, 1919 |
| 2,402,581 | Ruau | June 25, 1946 |
| 2,415,953 | Lowe | Feb. 18, 1947 |
| 2,444,949 | Musser | July 13, 1948 |
| 2,453,884 | Whipple | Nov. 16, 1948 |
| 2,460,929 | Goff | Feb. 8, 1949 |
| 2,461,574 | Skinner et al. | Feb. 15, 1949 |
| 2,469,400 | Newell | May 10, 1949 |
| 2,600,007 | Lippert | June 10, 1952 |